US011960229B2

(12) United States Patent
Iwasaki

(10) Patent No.: US 11,960,229 B2
(45) Date of Patent: Apr. 16, 2024

(54) IMAGE FORMING APPARATUS

(71) Applicant: CANON KABUSHIKI KAISHA, Tokyo (JP)

(72) Inventor: Atsushi Iwasaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/674,722

(22) Filed: Feb. 17, 2022

(65) Prior Publication Data

US 2022/0276603 A1 Sep. 1, 2022

(30) Foreign Application Priority Data

Mar. 1, 2021 (JP) ................................ 2021-031791

(51) Int. Cl.
*G03G 15/00* (2006.01)
*G03G 15/20* (2006.01)

(52) U.S. Cl.
CPC ......... *G03G 15/70* (2013.01); *G03G 15/2039* (2013.01)

(58) Field of Classification Search
CPC .......................... G03G 15/2039; G03G 15/70
See application file for complete search history.

(56) References Cited

U.S. PATENT DOCUMENTS

2004/0202498 A1* 10/2004 Ono ..................... G03G 15/206 399/329
2011/0182592 A1* 7/2011 Mizuno ................ G03G 15/238 399/8
2014/0105618 A1* 4/2014 Gilmore ............. G03G 15/2039 399/329
2017/0363997 A1* 12/2017 Kamo ................ G03G 15/2028

FOREIGN PATENT DOCUMENTS

| | | |
|---|---|---|
| JP | H07129018 | 5/1995 |
| JP | 2006276618 A | 10/2006 |
| JP | 2008191372 A | 8/2008 |
| JP | 2016012077 A | 1/2016 |
| JP | 2019007989 | 1/2019 |
| JP | 2020086349 | 6/2020 |

* cited by examiner

*Primary Examiner* — David H Banh
(74) *Attorney, Agent, or Firm* — Canon U.S.A., Inc. I.P. Division

(57) ABSTRACT

An image forming apparatus includes an image forming unit to form an image on a recording material and a fixing unit. The fixing unit fixes the image formed on the recording material to the recording material. The fixing unit includes a heating member and a pressing member to form a nip portion to nip and convey the recording material with the heating member. The fixing unit further includes a pressure adjusting mechanism to apply pressure to the nip portion and release or reduce the applied pressure. If a parameter for a cumulative usage of the fixing unit is a first value, frequency of release or reduction of the applied pressure is a first frequency. If the parameter for the cumulative usage is a second value greater than the first value, the frequency of release or reduction of the applied pressure is a second frequency lower than the first frequency.

13 Claims, 8 Drawing Sheets

IMAGE FORMING APPARATUS

BACKGROUND

Field

The present disclosure relates to image forming apparatuses, such as copying machines and printers.

Description of the Related Art

Image forming apparatuses that employ an electrophotographic system or an electrostatic recording system include a transfer unit that transfers a toner image onto a recording material and a fixing unit that fixes the toner image to the recording material by heating and pressing the toner image on the recording material.

In the image forming apparatuses, conveyance of recording materials at the fixing unit can be delayed because of some kind of error, that is, a jam can occur. Japanese Patent Laid-Open No. 7-129018 discloses a technique for automatically releasing the pressure of the fixing unit when a jam is detected using a recording-material detecting unit that detects the delay of a recording material at the fixing unit and a pressure release mechanism that releases the pressure of the fixing unit. This technique facilitates removing the recording material from the fixing unit in which a jam occurs.

Japanese Patent Laid-Open No. 2008-191372 discloses a technique for automatically releasing the pressure of the fixing unit by shifting to a sleep mode when the power of the image forming apparatus is turned off or when the image forming apparatus has not been used for a while. This technique allows preventing deterioration, such as deformation, of the fixing member caused by the long-time pressurization of the fixing unit.

There is a known configuration in which the extension and contraction of a compression coil spring or the like is adjusted using a cam member or the like for a pressure adjusting mechanism that applies and releases or reduces the applied pressure. Known examples of the fixing unit employ a heat roller method that uses a fixing roller housing a halogen heater and a pressure roller and a film heating method that uses a fixing film. The film heating type fixing unit forms a fixing nip by nipping a fixing film with a heater and a heater holder disposed inside the fixing film and a pressing member disposed on the outer surface of the fixing film.

The heater of the film heating type fixing unit is mounted on the heater holder disposed in the inner space of the cylindrical film. Between the heater holder and the heater, a thermistor for detecting the temperature of the heater, a thermal switch serving as a safety element, and other members (these members are hereinafter referred to as pressing members) are provided. These pressing members press the heater in a direction in which the heater is separated from the heater holder.

The pressure of the fixing unit is automatically released when the image forming apparatus detects a jam, when the power is turned off, or when the image forming apparatus shifts to a sleep mode. At that time, if the heater is separated from the heater holder by the pressure from the pressing members, the following phenomena may occur.

For example, the support state of the pressing members may change to make the temperature detection of the thermistor and the operation of the safety element unstable, or the edge of the heater may hit against the inner surface of the film to damage the inner surface of the film. Japanese Patent Laid-Open No. 2016-12077 discloses a configuration for preventing the heater from being separated by the pressing members by placing an adhesive at a predetermined portion between the heater and the heater holder to support the heater. A silicone-rubber-based elastic adhesive is used to absorb stress due to the difference in thermal expansion coefficient between the heater and the heater holder to resist a high temperature of 200° C. or more.

If a pressure applying operation and a release operation (hereinafter referred to as “butting-separating action”) by a pressure adjusting mechanism are repeated in the heating roller type or film heating type fixing unit, described above, the following phenomenon may occur. Specifically, a compression coil spring used in the pressure adjusting mechanism is plastically deformed by the repetition of extension and contraction to become unable to apply intended pressure.

If the butting-separating action is repeated in the film heating type fixing unit, with an adhesive interposed between the heater and the heater holder, the following phenomena may occur. Specifically, stress is applied in the thickness direction of the adhesive, which is a direction in which the heater and the heater holder are separated from each other, to decrease the adhesive force of the adhesive, making the adhesive prone to peel off.

Furthermore, if the terminals of connectors for supplying power to the heater acts as the pressing member, the heater may be slightly displaced by repeating the butting and separating action, so that the pressing portion of the terminal and the heater electrode slide slightly on each other to cause abrasion. Thus, even if an adhesive is interposed between the heater and the heater holder, as described above, the repeated butting and separating action can extend and contract the adhesive itself in the thickness direction of the heater to cause abrasion of the member.

The above issues gradually progress as the butting and separating action is repeated. The specifications of the members constituting the fixing unit are generally set to provide a sufficient margin for the number of butting and separating actions assumed in the life in which the quality is satisfied so that the above issues do not become apparent.

However, the number of butting and separating actions of the fixing unit depends on the user’s operating conditions. For this reason, issues caused by the repeated butting and separating action of the fixing unit need to be reduced regardless of the user’s operating conditions.

SUMMARY

According to an aspect of the present disclosure, an image forming apparatus includes an image forming unit to form an image on a recording material, and a fixing unit to fix the image formed on the recording material to the recording material, wherein the fixing unit includes a heating member and a pressing member to form a nip portion to nip and convey the recording material with the heating member, and further includes a pressure adjusting mechanism to apply pressure to the nip portion and release or reduce the applied pressure, wherein, if a parameter for a cumulative usage of the fixing unit is a first value, frequency of release or reduction of the applied pressure is a first frequency, and if the parameter for the cumulative usage is a second value greater than the first value, the frequency of release or reduction of the applied pressure is a second frequency lower than the first frequency.

Further features of the present disclosure will become apparent from the following description of exemplary embodiments with reference to the attached drawings.

DESCRIPTION OF THE EMBODIMENTS

Embodiments of the present disclosure will be described hereinbelow with reference to the drawings. It is to be understood that these embodiments do not limit the scope of the disclosure and not all of combinations of the features described in the embodiments are absolutely necessary for the present disclosure.

First Embodiment

1. Configuration of Image Forming Apparatus

Figure 1:
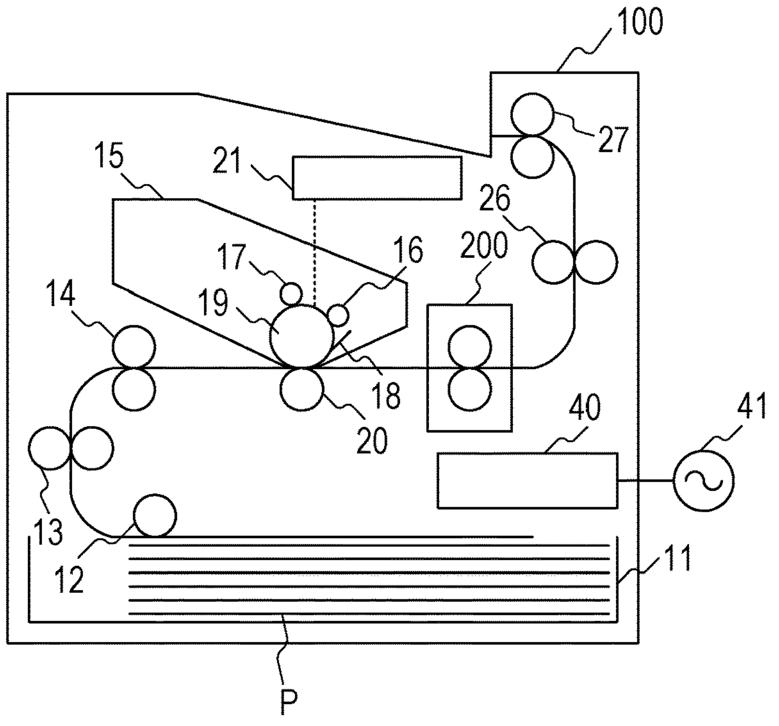
FIG. 1 is a cross-sectional view of an image forming apparatus.

FIG. 1 is a schematic configuration diagram of an image forming apparatus 100 according to a first embodiment. The image forming apparatus 100 is a laser printer using an electrophotographic recording technique. A photosensitive member 19 is charged to a predetermined polarity by a charging roller 16. When the image forming apparatus 100 receives a print signal from an external device, a scanner unit 21 radiates laser light according to the received image information to expose the photosensitive member 19 with the light. This forms an electrostatic latent image on the photosensitive member 19. A cartridge 15 includes a developing unit 17. The developing unit 17 supplies toner to the electrostatic latent image on the photosensitive member 19 to form a toner image according to the image information on the photosensitive member 19. A sheet cassette (a sheet feeding unit) 11 contains recording materials (recording paper) P. The recording materials P in the sheet cassette 11 are fed by a pickup roller 12 one by one and are conveyed by rollers 13 toward registration rollers 14. Each recording material P is conveyed from the registration rollers 14 to a transfer position formed by the photosensitive member 19 and a transfer roller 20 in accordance with the timing at which the toner image on the photosensitive member 19 reaches the transfer position. Since the recording material P passes through the transfer position, the toner image on the photosensitive member 19 is transferred to the recording material P. Thereafter, the recording material P is heated by a fixing unit 200, and the toner image transferred onto the recording material P is fixed to the recording material P.

The recording material P on which the toner image is fixed is discharged onto a tray at the top of the image forming apparatus 100 by rollers 26 and 27. A cleaner 18 is used to clean the photosensitive member 19. A control circuit 40 connected to a commercial alternating-current source 41 supplies electric power to the fixing unit 200. The photosensitive member 19, the charging roller 16, the scanner unit 21, the developing unit 17, and the transfer roller 20, described above, constitute an image forming unit that forms an unfixed image on the recording material P.

2. Configuration of Fixing Unit

Figure 2:
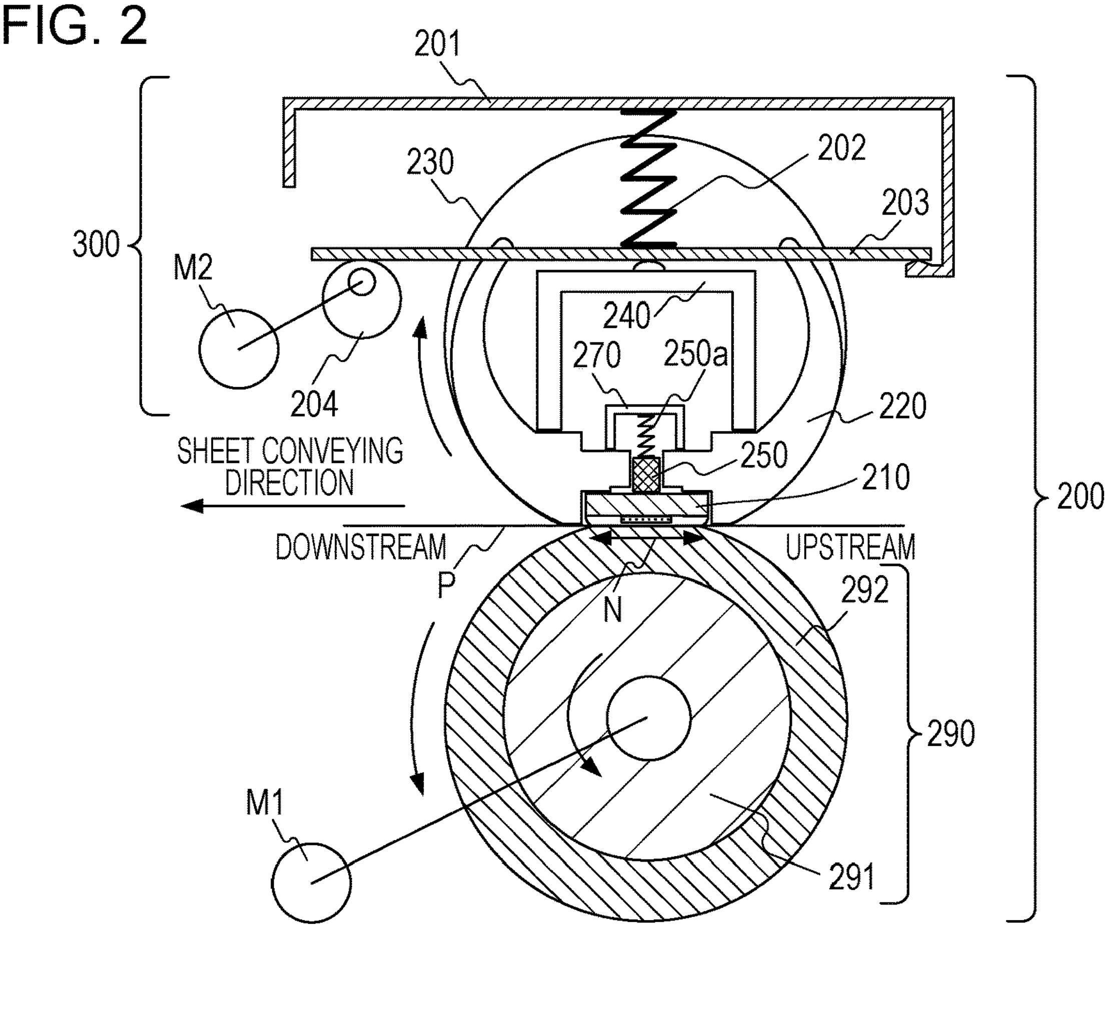
FIG. 2 is a cross-sectional view of a fixing unit.

FIG. 2 is a cross-sectional view of the fixing unit 200.

A heater 210 is a thin heating member including a plate-like base substrate made of ceramic, such as alumina, or metal, such as steel use stainless (SUS), and a resistive heating element that is provided on the substrate and that generates heat when energized. A heater holder 220 is a heater supporting member made of a heat resisting resin, such as a liquid crystal polymer, and supports the heater 210 via an adhesive member (described later). A pressure roller 290 is a pressing member that forms a fixing nip N, which is a pressure contact nip, with the heater 210 via a film 230. The pressure roller 290 includes a core metal 291 made of iron or aluminum and an elastic layer 292 made of silicone rubber or the like and rotates in the direction of the arrow by receiving a motive force from a motor M1. The film 230 is a cylindrical flexible member, which is heated by the heat from the heater 210 at the fixing nip N formed by the heater 210 and the pressure roller 290. The film 230 may include a base made of a heat resisting resin, such as polyimide, or metal, such as stainless steel, an elastic layer made of heat-resisting rubber, and a release layer made of heat resisting resin on the base. A pressure adjusting mechanism 300 is used to apply pressure for forming the fixing nip N and to release the pressure.

Figure 3A:
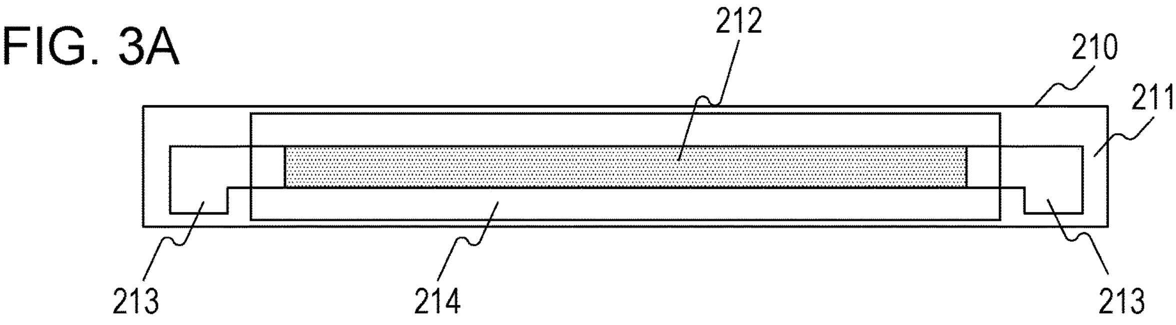
FIG. 3A is a plan view of a heater.
Figure 3B:
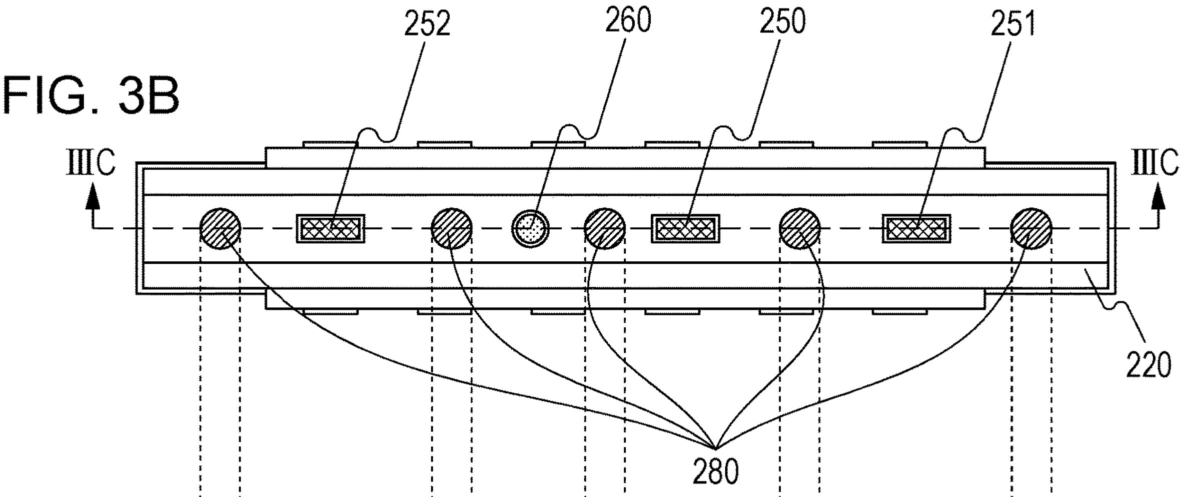
FIGS. 3B and 3C are diagrams illustrating the bond configuration of the heater and a heater holder in a first embodiment.
Figure 3C:
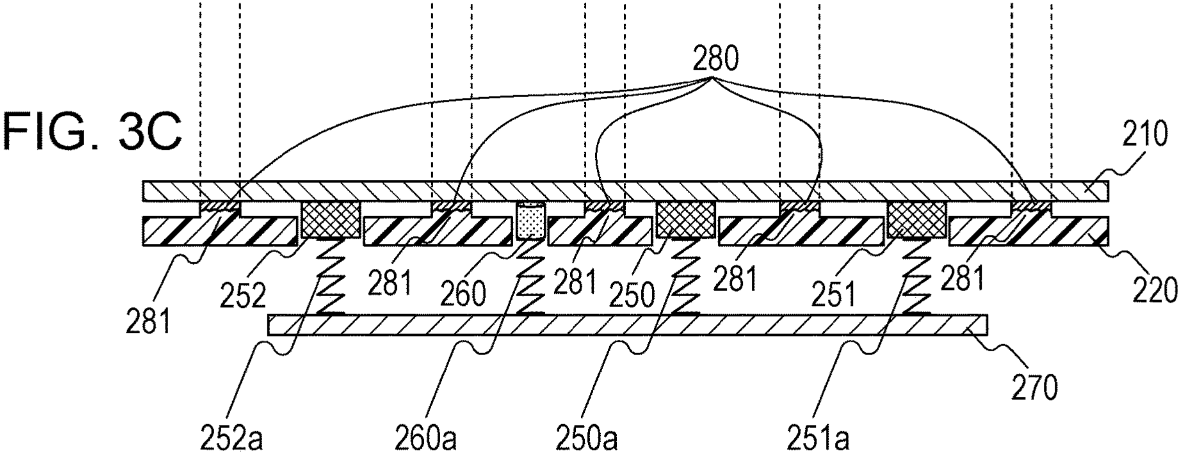

The surface of the heater 210 remote from the surface facing the film 230 is provided with a thermistor 250 and a safety element 260 shown in FIGS. 3B and 3C in pressure contact therewith. The thermistor 250 is a temperature detecting member for detecting the temperature of the heater 210 and feeding back the temperature for temperature control. In this embodiment, the thermistor 250 is a unit including a resistive element whose resistant value changes with temperature, a heat-resisting member, such as ceramic paper, supporting the resistive element, and a pressure-resisting member, such as polyimide film, covering the resistive element and the heat-resisting member. The thermistor 250 is brought into contact with the heater 210 by the pressure of a thermistor pressing spring 250*a* held by a pressing member holder 270. The safety element 260 is a protection element, such as a thermal cutoff or a thermal fuse, which is activated at an abnormally high temperature to cut off electric power supplied to the heater 210. The safety element 260 is brought into contact with the heater 210 by the pressure of a safety-element pressing spring 260*a* held by a pressing member holder 270.

A pressure stay 240 is a thick rigid member made of metal or the like, which is in contact with the surface of the heater holder 220 remote from the heater support surface and forms the fixing nip N by applying pressure to the pressure roller 290.

The pressure adjusting mechanism 300 includes a fixing frame 201, a pressure spring 202, a pressing plate 203, and a pressure release cam 204. In applying pressure to the fixing nip N, the pressure adjusting mechanism 300 applies the pressure of the pressure spring 202 held by the fixing frame 201 to the longitudinal opposite ends of the pressure stay 240 via the pressing plate 203. The pressure of the pressure spring 202 is transferred to the pressure roller 290 via the portion in contact with the heater holder 220 to form the fixing nip N.

The pressing plate 203 is in contact with the pressure release cam 204. In releasing the pressure at the fixing nip N, the pressure release cam 204 rotates by a predetermined amount by receiving a motive force from a motor M2 according to an instruction to release the pressure of the fixing unit 200. The predetermined amount of rotation of the pressure release cam 204 lifts the pressing plate 203 to release the pressure at the fixing nip N. The details of the operation for releasing the pressure of the fixing unit 200 will be described later. The release of the pressure in this embodiment includes, in addition to eliminating the pressure, reducing a pressure necessary for fixing a toner image onto the recording material P to an allowable degree against a jam and deformation of the components of the fixing unit 200.

3. Bond Configuration of Heater and Heater Holder

FIGS. 3A to 3C are diagrams illustrating the bond configuration of the heater 210 and the heater holder 220.

FIG. 3A is a plan view of the heater 210 seen from the fixing nip N. The heater 210 includes, on a substrate 211, a resistive heating element 212, electrodes 213 for energizing the resistive heating element 212, and a protective layer 214 that gives insulation protection to the resistive heating element 212. In this embodiment, the surface on which the resistive heating element 212 is disposed is adjacent to the pressure roller 290, and the opposite surface is bonded to the heater holder 220. Alternatively, the surface on which the resistive heating element 212 is disposed may be bonded to the heater holder 220.

FIG. 3B is a plan view of the heater support surface of the heater holder 220 seen from the fixing nip N. FIG. 3C is a cross-sectional view taken along line IIIC-IIIC of FIG. 3B in a state in which the heater 210 and the heater holder 220 are bonded with an adhesive 280.

The heater support surface of the heater holder 220 has through-holes at predetermined positions in the longitudinal direction, through which the thermistors 250, 251, and 252 and the safety element 260 are brought into pressure-contact with the heater 210. The heater holder 220 has bonding points 281 in the longitudinal direction so as to hold the thermistors 250, 251, and 252 and the safety element 260, and the heater 210 and the heater holder 220 are bonded with the silicone rubber adhesive 280.

4. Control for Adjusting Pressure of Fixing Unit

Next, control for adjusting the pressure of the fixing unit 200 in this embodiment will be described. The following control is executed by a central processing unit (CPU) (not shown) of the image forming apparatus 100.

In this embodiment, the image forming apparatus 100 includes a jam detection mechanism (not shown) serving as a conveyance-failure detecting unit that detects the conveyance failure of the recording material P. The jam detection mechanism can detect a jam of the recording material P in the fixing unit 200.

The image forming apparatus 100 further includes a power switch (not shown) serving as a power switching unit for switching between startup of the image forming apparatus 100 and paper feeding. The image forming apparatus 100 can be started (turned ON) or stopped (turned OFF) by the user switching the power switch.

The image forming apparatus 100 has a normal power mode in which the fixing unit 200 fixes a toner image onto a recording material P and a sleep mode which is a low power mode in which power consumption is low. The normal power mode shifts to the sleep mode when the apparatus is not used for a predetermined time. The sleep mode returns to the normal power mode upon reception of a print signal. In this embodiment, the normal power mode is also referred to as "first state", and the low power mode and the sleep mode are also referred to as "second state". The image forming apparatus 100 includes a timer (not shown) that measure the elapsed time from the end of image formation or a fixing operation. When the elapsed time from the end of image formation or a fixing operation reaches a predetermined time, the image forming apparatus 100 shifts to the sleep mode. The predetermined time may be set to a desired time by the user.

When at least one of the following conditions (releasing conditions [predetermined conditions]) is satisfied, the image forming apparatus 100 performs an operation for releasing the pressure of the fixing unit 200.

1. When a signal that the jam of the recording material P is detected is given.
2. When a signal to turn off the power of the image forming apparatus 100 is given.
3. When the image forming apparatus 100 has not been used for a predetermined time, so that a signal to shift to the sleep mode is given.

When at least one of the following conditions (application conditions) is satisfied, the image forming apparatus 100 performs an operation for applying the pressure of the fixing unit 200.

1. When the recording material P jammed at the fixing unit 200 is removed.
2. When the power of the image forming apparatus 100 is turned on.
3. When the image forming apparatus 100 returns from the sleep mode.

5. Control for Releasing Pressure of Fixing Unit

Next, control for releasing the pressure of the fixing unit 200 will be described.

The image forming apparatus 100 of this embodiment includes a sheet counter (not shown) serving as a sheet counting unit that measures "the number Cp of recording materials P (sheet count Cp) that have passed through the fixing unit 200" as a parameter for the cumulative usage of the fixing unit 200. A predetermined threshold Cp1 is set as a threshold corresponding to a sheet count assuming, for example, the life of the fixing unit 200 that satisfies the quality.

Figure 4:
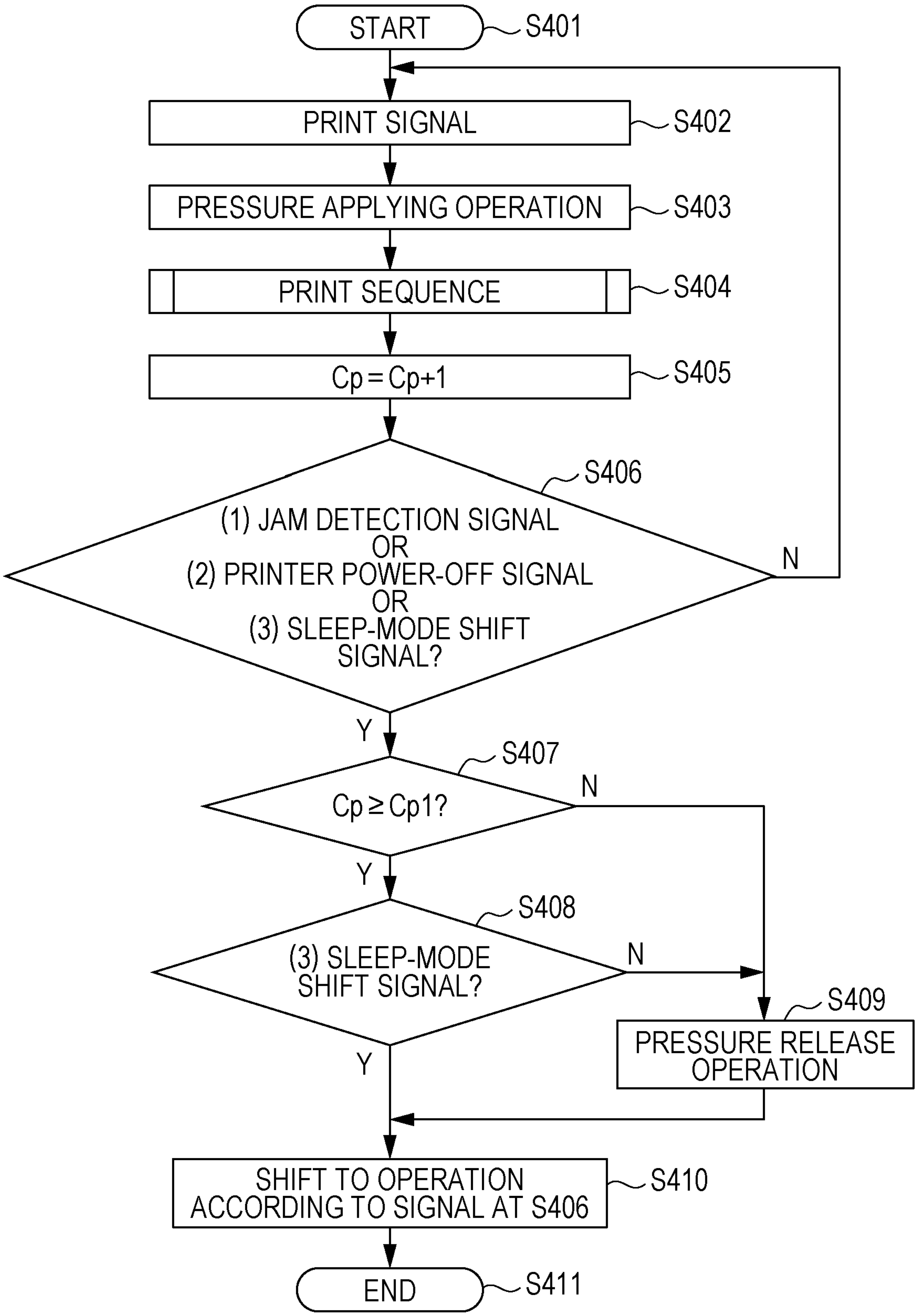
FIG. 4 is control flowchart 1 for releasing the pressure of the fixing unit in the first embodiment.
Figure 5:
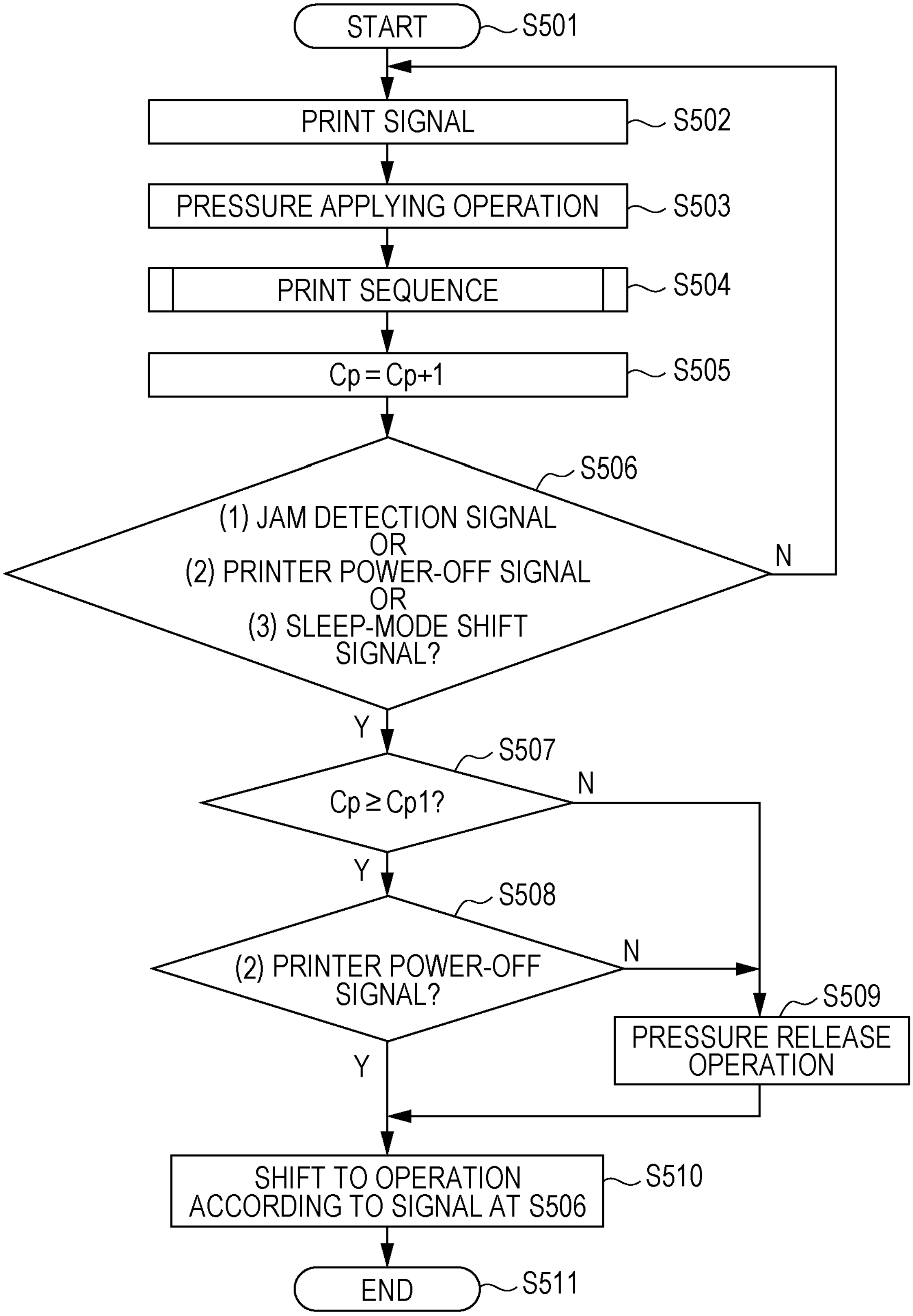
FIG. 5 is control flowchart 2 for releasing the pressure of the fixing unit in the first embodiment.
Figure 6:
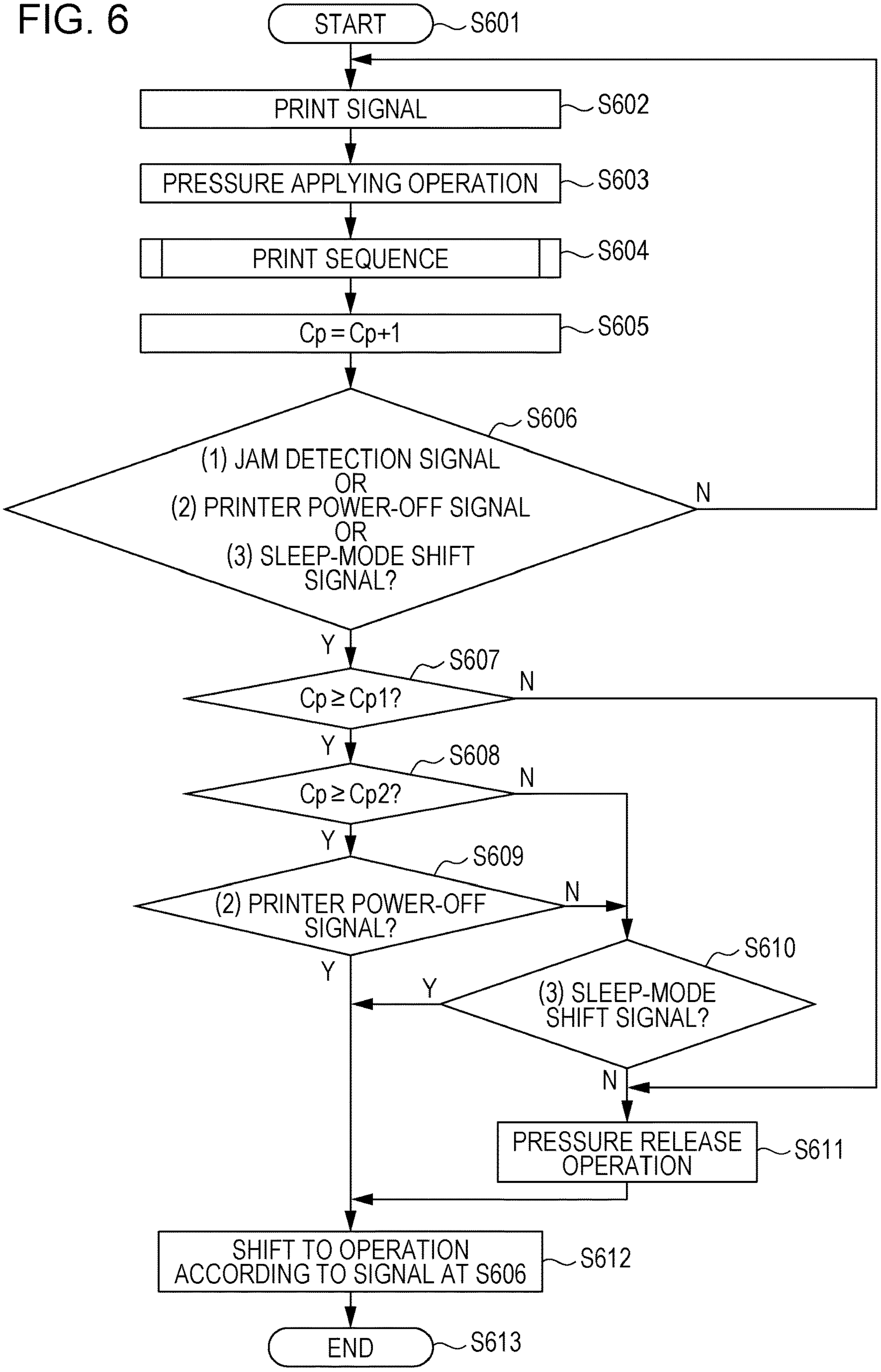
FIG. 6 is control flowchart 3 for releasing the pressure of the fixing unit in the first embodiment.

In this embodiment, the following control is executed before the sheet count Cp reaches the threshold Cp1 during the operation of the image forming apparatus 100. In other words, when at least one of the release conditions 1 to 3 is satisfied, the pressure of the fixing unit 200 is released. In contrast, for the period after the sheet count Cp reaches the threshold Cp1, a case in which pressure is not released even when at least one of the release conditions 1 to 3 is satisfied is assumed. Specifically, the control of the flowcharts shown in FIGS. 4 to 6 is executed. The value of the sheet count Cp before reaching the threshold Cp1 is also referred to as "first value". The value of the sheet count Cp after reaching the threshold Cp1 is also referred to as "second value".

6. Control after Sheet Count Cp Reaches Threshold Cp1

FIGS. 4 to 6 show control flowcharts 1 to 3 in this embodiment.

Flowchart 1

Control flowchart 1 of FIG. 4 shows an example in which, when the release condition 3 of the three release conditions 1 to 3 is satisfied after the sheet count Cp reaches the threshold Cp1, the pressure of the fixing unit 200 is not released. In other words, after the sheet count Cp reaches the threshold Cp1, the pressure of the fixing unit 200 is not released even if the image forming apparatus 100 has not been used for a predetermined time, so that a signal to shift to the sleep mode is given.

When the image forming apparatus 100 receives a print signal (S402), the pressure of the fixing unit 200 is applied (S403). The image forming apparatus 100 executes a print sequence (S404), and when the recording material P passes through the fixing unit 200, the sheet count Cp is counted by a sheet counter (not shown) (S405). If at least one of the release conditions 1 to 3 is satisfied (S406), it is determined whether the sheet count Cp has reached the threshold Cp1 (S407). If the sheet count Cp has reached the threshold Cp1, then it is determined whether the release condition "3. When the image forming apparatus 100 has not been used for a predetermined time, so that a signal to shift to the sleep mode is given" is satisfied (S408). In other words, if the image forming apparatus 100 has received a sleep-mode shift signal, the pressure is not released, and the process goes to the process of S410. If the release condition 3 is not satisfied, the pressure is released (S409). Thereafter, at S410, the image forming apparatus 100 operates according the condition of the release conditions 1 to 3 satisfied at S406. For example, if the release condition 1 is satisfied, the image forming apparatus 100 notifies the user that the recording material P is jammed. If the release condition 2 is satisfied, the image forming apparatus 100 turns off the power. If the release condition 3 is satisfied, the image forming apparatus 100 shifts to the sleep mode.

The control of the flowchart 1 decreases the frequency of the release of the pressure of the fixing unit 200 after the sheet count Cp reaches the threshold Cp1. In an example model case, conditions for releasing the pressure of the fixing unit 200 are the release condition 1: the release condition 2: the release condition 3=1:39:60. In this case, the control of the flowchart 1 decreases the frequency of the release of the pressure of the fixing unit 200 to about 40% after the sheet count Cp reaches the threshold Cp1, preventing an increase in the cumulative number of times of the release of the pressure of the fixing unit 200. Thus, the issues caused by the repeated butting and separating action of the fixing unit 200 can be reduced or eliminated. The frequency of the release of the pressure of the fixing unit 200 before the sheet count Cp reaches the threshold Cp1 is also referred to as "first frequency", and the frequency of the release of the pressure of the fixing unit 200 after the sheet count Cp reaches the threshold Cp1 is also referred to as "second frequency". Thus, this embodiment makes the second frequency lower than the first frequency.

Flowchart 2

Control flowchart 2 of FIG. 5 shows an example in which, after the sheet count Cp reaches the threshold Cp1, when the release conditions 1 and 3 are satisfied, the pressure is released, but when the release condition 2 is satisfied, the pressure is not released. In other words, after the sheet count Cp reaches the threshold Cp1, the pressure of the fixing unit 200 is not released even if a signal to turn off the power of the image forming apparatus 100 is given.

In the flowchart 2 of FIGS. 5, S501 to S511 correspond to S401 to S411 of the flowchart 1 of FIG. 4, respectively, and only S508 differs from the flowchart 1 of FIG. 4. At S508, the image forming apparatus 100 determines whether the release condition "2. When a signal to turn off the power of the image forming apparatus 100 is given" is satisfied.

The control of the flowchart 2 decreases the frequency of the release of the pressure of the fixing unit 200 after the sheet count Cp reaches the threshold Cp1. In the above example model case, the control of the flowchart 2 decreases the frequency of the release of the pressure of the fixing unit 200 to about 60% after the sheet count Cp reaches the threshold Cp1. Thus, the issues caused by the repeated butting and separating action of the fixing unit 200 can be reduced or eliminated.

Flowchart 3

Control flowchart 3 of FIG. 6 shows a combination of the above two flowcharts. For example, a first threshold Cp1 is set as a threshold corresponding to a sheet count assuming the life of the fixing unit 200 that satisfies the quality, and a second threshold Cp2 is set as a value greater than the first threshold Cp1. If the release condition 3 is satisfied after the sheet count Cp reaches the first threshold Cp1, the pressure is not released. If the release condition 2 is satisfied after the sheet count Cp reaches the second threshold Cp2, the pressure is not released. The release condition 3, which is taken into account after the sheet count Cp reaches the first threshold Cp1, is also referred to as "first condition", and the release condition 2, which is taken into account after the sheet count Cp reaches the second threshold Cp2, is also referred to as "second condition".

Since S601 to S606 of the flowchart 3 in FIG. 6 correspond to S401 to S406 of the flowchart 1 in FIG. 4, the processes after S607 will be described. If the image forming apparatus 100 satisfies at least one of the release conditions 1 to 3 (S606), it is determined whether the sheet count Cp has reached the first threshold Cp1 (S607). If the sheet count Cp has not reached the first threshold Cp1, a pressure release operation is performed (S611).

If the sheet count Cp has reached the first threshold Cp1, then it is determined whether the sheet count Cp has reached the second threshold Cp2 (S608). If the sheet count Cp has not reached the second threshold Cp2, it is determined whether the release condition 3 is satisfied (S610). If the release condition 3 is not satisfied, the image forming apparatus 100 performs a pressure release operation (S611), and if the release condition 3 is satisfied, the image forming apparatus 100 does not perform the pressure release operation and goes to S612. If at S608 the sheet count Cp has reached the second threshold Cp2, it is determined whether the release condition 2 is satisfied (S609). If the release condition 2 is not satisfied, the process goes to S610. If at S609 the release condition 2 is satisfied, the image forming apparatus 100 does not perform the pressure release operation and goes to S612. Since the processes of S612 and S613 are the same as those of S410 and S411 in FIG. 4, descriptions thereof will be omitted.

The control of the flowchart 3 decreases the frequency of the release of the pressure after the sheet count Cp reaches the first threshold Cp1 and further decreases the frequency of the release of the pressure after the sheet count Cp reaches the second threshold Cp2. In the above model case, the control of the flowchart 3 decreases the frequency of the release of the pressure to about 40% after the sheet count Cp reaches the first threshold Cp1, and further decreases the frequency to about 1% after the sheet count Cp reaches the second threshold Cp2. This prevents an increase in the cumulative number of times of the release of the pressure. Thus, the issues caused by the repeated butting and separating action of the fixing unit 200 can be reduced or eliminated.

Figure 7:
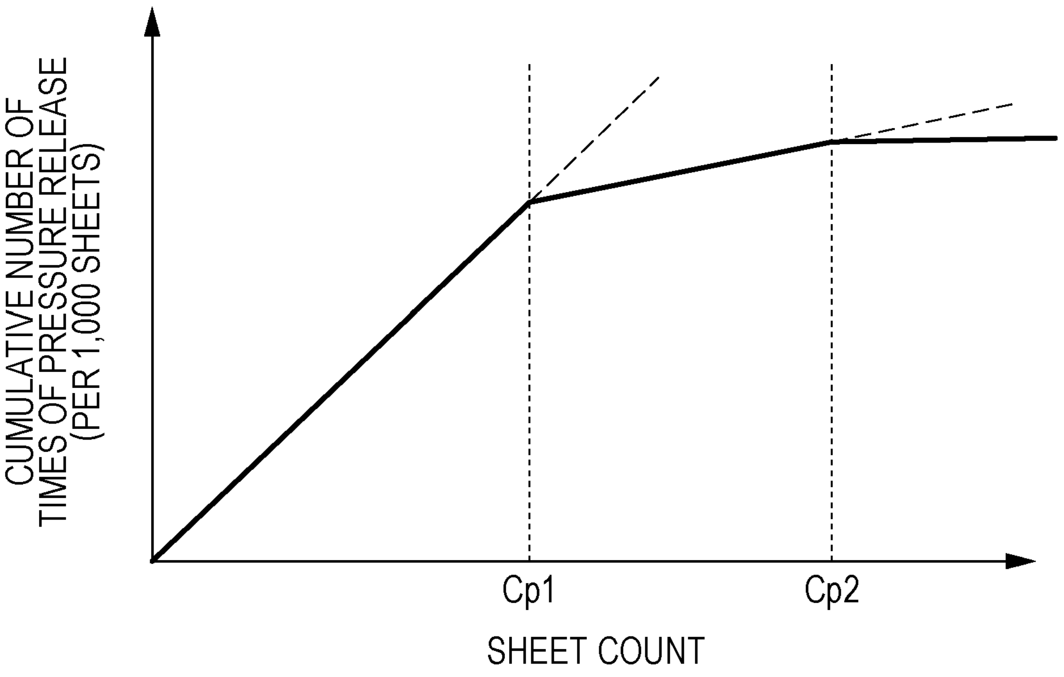
FIG. 7 is a graph showing the transition of the cumulative number of times of pressure release of the fixing unit in a model case in which the control flowchart 3 in the first embodiment is used.

FIG. 7 shows the transition of the cumulative number of times of pressure release (vertical axis) relative to the sheet count Cp (horizontal axis) in executing the processing of the flowchart 3 in FIG. 6 is executed in the above model case.

As shown in FIG. 7, before the sheet count Cp reaches the first threshold Cp1, the pressure is released in any of the release conditions 1 to 3. For this reason, the cumulative number of times of pressure release per unit, for example, per 1,000 sheets, increases with a nearly constant inclination as the number of recording materials P that have passed through the fixing unit 200 increases. In contrast, after the sheet count Cp reaches the first threshold Cp1, the pressure is not released when the release condition 3 is satisfied, and the frequency of pressure release decreases, decreasing the inclination of the graph. If at least one of the release conditions 2 and 3 is satisfied after the sheet count Cp reaches the second threshold Cp2, the pressure is not released. In other words, after the sheet count Cp reaches the second threshold Cp2, the pressure is released only in the case of the release condition 1. For this reason, the frequency of pressure release is further decreased, and the inclination of the graph is further decreased.

By setting the thresholds Cp1 and Cp2 appropriately and releasing the pressure in a state in which the fixing unit 200 is not used for a long time, as at power-off or in the sleep mode, in a period in which the quality of the fixing unit 200 is satisfied, the deterioration, such as deformation, of the fixing member can be prevented. If the period in which the quality of the fixing unit 200 is satisfied has passed, decreasing the frequency of pressure release allows preventing a decrease in pressure caused by the plastic deformation of the pressure spring 202 used in the pressure adjusting mechanism 300. For the film heating type fixing unit, the issue of the decrease in the adhesive force between the heater 210 and the heater holder 220 can be avoided.

In this embodiment, the thermistor 250 and the safety element 260, serving as pressing members, are disposed on the back of the heater 210 (the surface of the heater 210 opposite to the fixing nip N). However, adopting the control as in this embodiment for a configuration in which the terminals of connectors for supplying power to the electrodes of the heater 210 are disposed as pressing members provides similar advantageous effects. By decreasing the frequency of pressure release as in this embodiment, the issue of a small change in the position of the heater 210, so that the terminals of the power supply connectors and the electrodes of the heater 210 slide slightly to cause abrasion of the members can be avoided.

Having described the fixing unit 200 using the film heating type fixing unit as an example, this is given for mere illustrative purposes. Performing the control as in this embodiment for various fixing units including a thermal roller type including a heating member, a pressing member that forms a pressure contact nip with the heating member, and a pressure adjusting mechanism also provides similar effects as in this embodiment.

Although the sheet count Cp of the recording material P is used as a parameter for the cumulative usage of the fixing unit 200, this is given for mere illustrative purposes. Operating time t, such as the rotation time of the rotating body in the fixing unit 200 or the heating time by the heater 210 may be used as a parameter. In this case, an operating-time measuring unit that measures the operating time t may be provided.

Having described an example in which the frequency of pressure release is decreased when the power is turned off or when the apparatus shifts to the sleep mode, this is given for mere illustrative purposes. The frequency of pressure release may be decreased when a jam is detected. In an image forming apparatus that performs a pressure release operation using a fourth release condition or a fifth release condition other than the release conditions 1 to 3, the frequency of pressure release according to the fourth release condition or the frequency of pressure release according to the fifth release conditions may be decreased.

Second Embodiment

In the first embodiment, the sheet count Cp of the recording materials P or the operating time t of the fixing unit 200 is used as a parameter for cumulative usage of the fixing unit 200. In this embodiment, the cumulative number of times of pressure release is used as a parameter for the cumulative usage of the fixing unit 200. The configurations of the image forming apparatus 100 and the fixing unit 200 in this embodiment are the same as those of the first embodiment, and description thereof will be omitted.

7. Control for Releasing Pressure of Fixing Unit

Control for releasing the pressure of the fixing unit 200 in this embodiment will be described. The following control is executed by a CPU (not shown) provided in the fixing unit 200 or the image forming apparatus 100 fitted with the fixing unit 200.

The fixing unit 200 of this embodiment measures "the number of times (pressure release count) Ck the pressure is actually released or reduced" when at least one of the release conditions 1 to 3 described in the first embodiment is satisfied. The image forming apparatus 100 includes a counter (not shown) serving as a pressure-release counting unit. A first threshold Ck1 and a second threshold Ck2 higher than the first threshold Ck1 are set, as in the first embodiment.

In this embodiment, the following control is executed before the pressure release count Ck reaches the first threshold Ck1 during the operation of the image forming apparatus 100. In other words, if at least one of the release conditions 1 to 3 described in the first embodiment is satisfied, the pressure of the fixing unit 200 is released. In contrast, after the pressure release count Ck reaches the first threshold Ck1, the control of the flowchart shown in FIG. 8 is executed.

8. Control after Pressure Release Count Ck Reaches First Threshold Ck1

Figure 8:
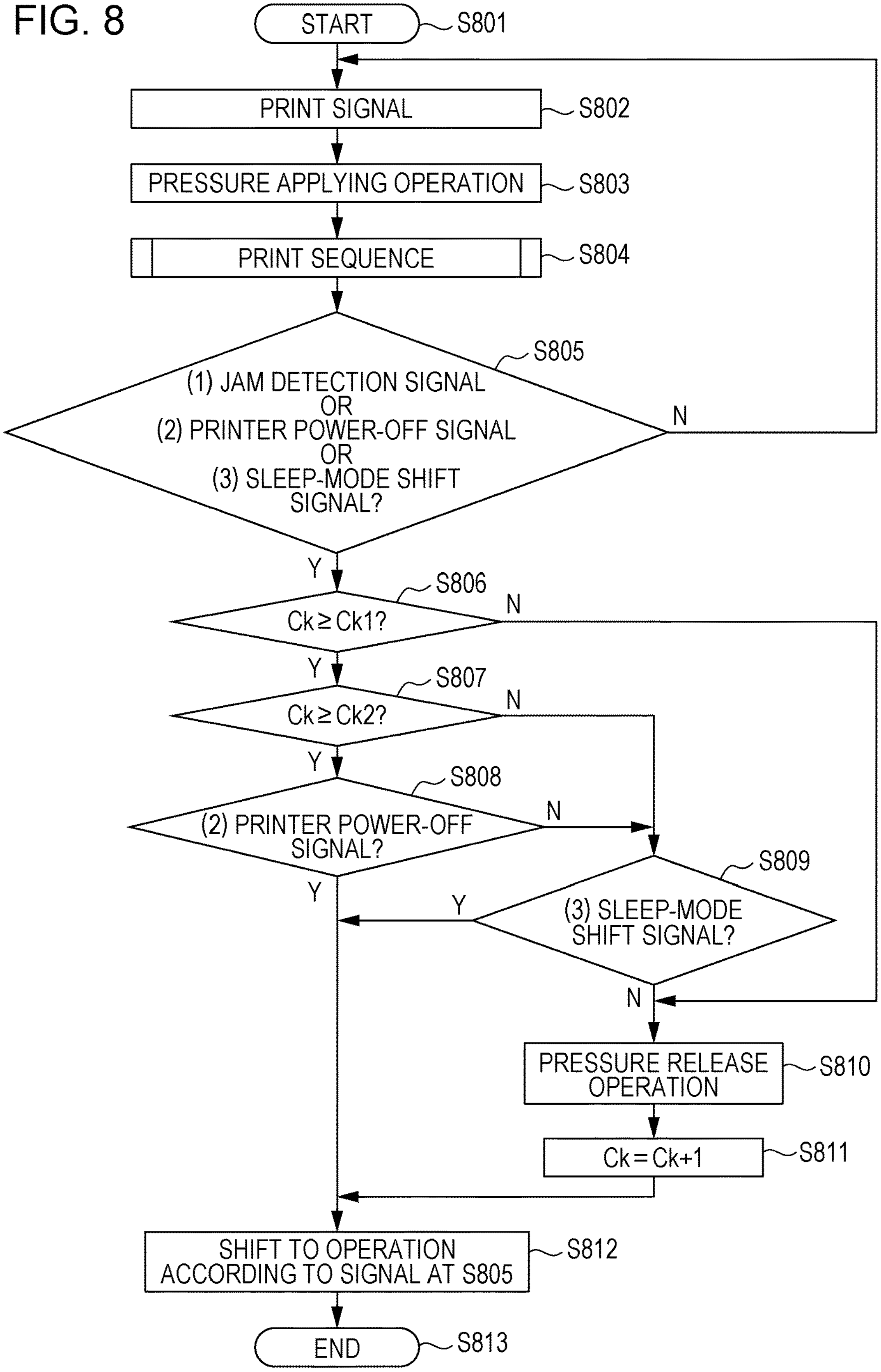
FIG. 8 is control flowchart 4 for releasing the pressure of the fixing unit in a second embodiment.

FIG. 8 shows Control flowchart 4 in this embodiment.

Flowchart 4

Control flowchart 4 of FIG. 8 shows an example in which, when the release condition 3 is satisfied after the pressure release count Ck reaches the first threshold Ck1, the pressure is not released. In other words, after the pressure release count Ck reaches the first threshold Ck1, the pressure is not released even if the image forming apparatus 100 has received a signal to shift to the sleep mode. If the release condition 2 is satisfied after the pressure release count Ck reaches the second threshold Ck2, the pressure is not released. In other words, after the pressure release count Ck reaches the second threshold Ck2, the pressure is not released even if the image forming apparatus 100 has received a signal to turn off the power of the image forming apparatus 100.

Since S801 to S805 of the flowchart 4 in FIG. 8 substantially correspond to S601 to S606 of the flowchart 3 in FIG. 6, the processes after S806 will be described. If the image forming apparatus 100 satisfies at least one of the release conditions 1 to 3 (S805), it is determined whether the pressure release count Ck has reached the first threshold Ck1 (S806). If the pressure release count Ck has not reached the first threshold Ck1, a pressure release operation is performed (S810), and the pressure release count Ck is counted up (S811). If the pressure release count Ck has reached the first threshold Ck1, then it is determined whether the pressure release count Ck has reached the second threshold Ck2 (S807). If the pressure release count Ck has not reached the second threshold Ck2, it is determined whether the release condition 3 is satisfied (S809). If the release condition 3 is not satisfied, a pressure release operation is performed (S810). If the release condition 3 is satisfied, the CPU does not perform the pressure release operation and goes to S812. If at S807 the pressure release count Ck has reached the second threshold Ck2, then it is determined whether the release condition 2 is satisfied (S808). If the release condition 2 is not satisfied, the process goes to S809. If at S808 the release condition 2 is satisfied, the CPU does not perform the pressure release operation and goes to S812. The processes of S812 and S813 are the same as those of S410 and S411 in FIG. 4, and descriptions thereof will be omitted.

By the control of the flowchart 4, the frequency of pressure release becomes low after the pressure release count Ck reaches the first threshold Ck1. After the pressure release count Ck reaches the second threshold Ck2, the frequency of pressure release is further decreased.

For example, in the model case described in the first embodiment, the processing of flowchart 4 decreases the frequency of pressure release to about 40% after the pressure release count Ck reaches the first threshold Ck1. After the pressure release count Ck reaches the second threshold Ck2, the frequency is further decreased to about 1%. This prevents an increase in the cumulative number of times of pressure release. Thus, the issues caused by the repetition of the butting and separating action of the fixing unit 200 can be avoided.

Figure 9:
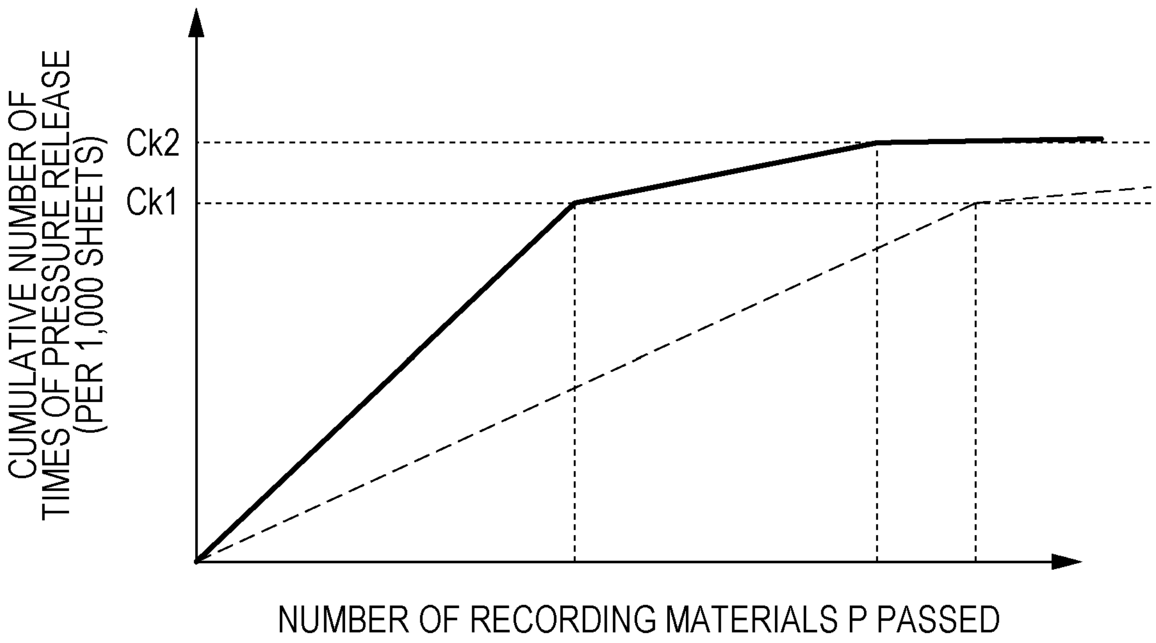
FIG. 9 is a graph of the transition of a cumulative number of times of pressure release of the fixing unit in two model cases in which the control flowchart 4 of the second embodiment is used.

FIG. 9 is a graph of comparison between two model cases in which the fixing unit 200 is used in different ways. The graph shows the transition of a cumulative number of times of pressure release operation (vertical axis) relative to the number of recording materials P that have passed through the fixing unit 200 (horizontal axis). Example usages in the model cases will be described. Model case 1 (solid line) is the model case described in the first embodiment, in which the proportion of the release condition 1, the release condition 2, and the release condition 3 is 1:39:60. In this case, the pressure release count per 1,000 recording materials P is 10. In contrast, model case 2 (broken line) is a case in which the proportion of the release condition 1, the release condition 2, and the release condition 3 is 1:9:90. In this case, the pressure release count per 1,000 recording materials P is 5.

The inclination of the graph (the frequency of pressure release per unit) differs between the model case 1 and the model case 2, as shown in FIG. 9. Therefore, the numbers of recording materials P that have passed until the pressure release count Ck reaches the first threshold Ck1 differ, and the inclinations after the pressure release count Ck reaches the first threshold Ck1 also differ.

The issues caused by repetition of the butting and separating action of the fixing unit 200 greatly depends on the cumulative number of times of pressure release of the fixing unit 200. For this reason, setting the threshold of the cumulative number of times of pressure release to decrease the frequency of pressure release allows for appropriately dealing with the above issues.

Third Embodiment

The first and second embodiments describe control for decreasing the frequency of the butting and separating action by setting a value assuming a life that satisfies the quality of the fixing unit 200 as a threshold using parameters for the cumulative usage of the fixing unit 200. The third embodiment also uses a parameter for the cumulative usage of the fixing unit 200. This embodiment differs from the above embodiments in that step-by-step elapsed times from a predetermined timing until the pressure of the fixing unit 200 is released are set in advance. This embodiment decreases the frequency of the pressure release of the fixing unit 200 by increasing the elapsed time from a predetermined timing until the pressure of the fixing unit 200 is released every time the value of the parameter for the cumulative usage of the fixing unit 200 increases. The configurations of the image forming apparatus 100 and the fixing unit 200 in this embodiment are the same as those of the first embodiment, and description thereof will be omitted.

9. Control for Releasing Pressure of Fixing Unit

Control for releasing the pressure of the fixing unit 200 in this embodiment will be described. The following control is executed by a CPU (not shown) provided in the fixing unit 200 or the image forming apparatus 100 fitted with the fixing unit 200.

The image forming apparatus 100 of this embodiment measures the pressure release count Ck described in the second embodiment. A plurality of thresholds Ckj (j=1 to n) is set. The thresholds Ckj increase in value as j increases in value. For example, a threshold Ck1 is set to the upper limit of the number of times of pressure release assuming a life that satisfies the quality of the fixing unit 200. A threshold Ckn is set to the upper limit of the number of times of pressure release assuming a range in which malfunction of the pressure spring 202 does not become obvious. The other thresholds Ckj are each set to a value obtained by dividing the values between Ck1 and Ckn evenly according to the number of thresholds.

In this embodiment, the following control is executed for the period before the pressure release count Ck reaches the threshold Ck1 during the operation of the image forming apparatus 100. In other words, if at least one of the release conditions 1 to 3 is satisfied, the pressure is released instantly. In contrast, for the period after the pressure release count Ck reaches the threshold Ck1, the following control is executed.

In other words, a condition for releasing the pressure is changed every time the pressure release count Ck reaches the threshold Ckj so that the frequency of pressure release gradually decreases.

10. Control after Pressure Release Count Ck Reaches Threshold Ck

The image forming apparatus 100 sets elapsed times tsj (j=1 to 3) from the time at which the image forming apparatus 100 shifts to the sleep mode for the individual thresholds Ckj (j=1 to 3), as shown in Table 1. The pressure is not released until the set elapsed time tsj passes. The image forming apparatus 100 sets elapsed times tdj (j=1 to 3) from the time the power of the image forming apparatus 100 is turned on to the time the power is turned off for the individual thresholds Ckj (j=1 to 3), as shown in Table 1. The pressure is not released until the set elapsed time tdj passes. The elapsed time tsj and the elapsed time tdj are longer as j increases.

If the pressure release count Ck is less than the threshold Ck1 (=10,000), the pressure is released instantly when at least one of the release conditions 1 to 3 is satisfied, as described above. In contrast, after the pressure release count Ck reaches the threshold Ck1, the pressure is not released every time the pressure release count Ck reaches the threshold Ckj until the elapsed time tsj and the elapsed time tdj pass.

TABLE 1

| Pressure Release Count Ck | Elapsed Time from Shift to Sleep Mode tsj | Elapsed Time from Power ON to OFF tdj |
|---|---|---|
| Ck < Ck1 = 10,000 | Instantly | Any |
| Ck1 ≤ Ck < Ck2 = 14,000 | ts1 = 2 hours | td1 = 12 hours |
| Ck2 ≤ Ck < Ck3 = 18,000 | ts2 = 4 hours | td2 = 24 hours |
| Ck3 ≤ Ck | ts3 = 8 hours | td3 = 48 hours |

By the control as in this embodiment, the condition for releasing the pressure changes gradually step by step after the pressure release count Ck reaches the threshold Ck1, so that the frequency of pressure release per unit number decreases gradually. This therefore reduces or eliminates a rapid change in the quality of the fixing unit 200 due to a change in the frequency of pressure release.

Although this embodiment shows an example in which discrete thresholds are set for the parameter for the cumulative usage of the fixing unit 200, and the predetermined condition for releasing the pressure of the fixing unit 200 is changed every time the usage reaches the threshold, this is given for mere illustrative purposes. Alternatively, predetermined continuous conditions for releasing the pressure of the fixing unit 200 may be set according to continuous values that change in the direction of an increase in cumulative usage. This allows the frequency of pressure release to be continuously decreased.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-031791, filed Mar. 1, 2021, which is hereby incorporated by reference herein in its entirety.

What is claimed is:

1. An image forming apparatus comprising:

an image forming unit to form an image on a recording material; and a fixing unit to fix the image formed on the recording material to the recording material, wherein the fixing unit includes a heating member, and a pressing member configured to form a nip portion to nip and convey the recording material with the heating member, and further includes a pressure adjusting mechanism to apply pressure to the nip portion and release or reduce the applied pressure, wherein, before a parameter of a cumulative usage of the fixing unit reaches a threshold, in a case where one condition of a plurality of predetermined conditions is satisfied, the applied pressure of the fixing unit is released or reduced by the applied pressure adjusting mechanism, and wherein, after the parameter of the cumulative usage of the fixing unit reaches the threshold, in a case where a specific condition of the plurality of predetermined conditions is satisfied, the applied pressure of the fixing unit is not released or reduced, and in a case where one condition of the plurality of predetermined conditions other than the specific condition is satisfied, the applied pressure of the fixing unit is released or reduced by the applied pressure adjusting mechanism.

2. The image forming apparatus according to claim 1, wherein the plurality of predetermined conditions is at least two of the following:

a case in which a signal indicating detection of a jam of the recording material is given, a case in which a signal to turn off power of the image forming apparatus is given, and a case in which the image forming apparatus is not used for a predetermined time and a signal to shift to a sleep mode is given.

3. The image forming apparatus according to claim 1, further comprising a sheet counting unit configured to measure a count of recording materials that have passed through the fixing unit, wherein the parameter of the cumulative usage is the count of the recording materials measured by the sheet counting unit.

4. The image forming apparatus according to claim 1, further comprising an operating-time measuring unit configured to measure an operating time of the fixing unit, wherein the parameter of the cumulative usage is the operating time measured by the operating-time measuring unit.

5. The image forming apparatus according to claim 1, further comprising a pressure-release counting unit configured to measure a count of release or reduction of the applied pressure of the fixing unit, wherein the parameter of the cumulative usage is the count of release or reduction of the applied pressure measure by the applied pressure-release counting unit.

6. The image forming apparatus according to claim 1, wherein the plurality of predetermined conditions are at least three conditions different from each other and the specific condition is a first specific condition, wherein a second threshold, which is larger than the threshold, is set, and wherein, after the parameter of the cumulative usage of the fixing unit reaches the second threshold, in a case where the first specific condition, a second specific condition, or a third specific condition of the plurality of predetermined conditions is satisfied, the applied pressure of the fixing unit is not released or reduced, and in a case where the predetermined conditions of the plurality of predetermined conditions other than the first specific condition, the second specific condition, and the third specific condition are satisfied, the applied pressure of the fixing unit is released or reduced by the applied pressure adjusting mechanism.

7. The image forming apparatus according to claim 1, wherein the heating member includes a cylindrical film and a heater disposed inside the cylindrical film, wherein the heater and the pressing member form the nip portion with the cylindrical film between the heater and the pressing member, and wherein the image on the recording material is heated through the cylindrical film at the nip portion.

8. An image forming apparatus comprising:

an image forming unit to form an image on a recording material; and a fixing unit to fix the image formed on the recording material to the recording material, wherein the fixing unit includes a heating member, and a pressing member configured to form a nip portion to nip and convey the recording material with the heating member, and further includes a pressure adjusting mechanism to apply pressure to the nip portion and release or reduce the applied pressure, wherein, before a parameter of a cumulative usage of the fixing unit reaches a threshold, in a case where one condition of a plurality of predetermined conditions is satisfied, the applied pressure of the fixing unit is released or reduced by the applied pressure adjusting mechanism, wherein, after the parameter of the cumulative usage of the fixing unit reaches the threshold, in a case where a specific condition of the plurality of predetermined conditions is satisfied, the applied pressure of the fixing unit is not released or reduced, and in a case where one condition of the plurality of predetermined conditions other than the specific condition is satisfied, the applied pressure of the fixing unit is released or reduced by the applied pressure adjusting mechanism, and wherein the plurality of predetermined conditions is at least two of the following:

a case in which a signal indicating detection of a jam of the recording material is given, a case in which a signal to turn off power of the image forming apparatus is given, and a case in which the image forming apparatus is not used for a predetermined time and a signal to shift to a sleep mode is given.

9. The image forming apparatus according to claim 8, further comprising a sheet counting unit configured to measure a count of recording materials that have passed through the fixing unit, wherein the parameter of the cumulative usage is the count of the recording materials measured by the sheet counting unit.

10. The image forming apparatus according to claim 8, further comprising an operating-time measuring unit configured to measure an operating time of the fixing unit, wherein the parameter of the cumulative usage is the operating time measured by the operating-time measuring unit.

11. The image forming apparatus according to claim 8, further comprising a pressure-release counting unit configured to measure a count of release or reduction of the applied pressure of the fixing unit, wherein the parameter of the cumulative usage is the count of release or reduction of the applied pressure measure by the applied pressure-release counting unit.

12. The image forming apparatus according to claim 8, wherein the plurality of predetermined conditions are at least three conditions different from each other and the specific condition is a first specific condition, wherein a second threshold, which is larger than the threshold, is set, and wherein, after the parameter of the cumulative usage of the fixing unit reaches the second threshold, in a case where the first specific condition, a second specific condition, or a third specific condition of the plurality of predetermined conditions is satisfied, the applied pressure of the fixing unit is not released or reduced, and in a case where the predetermined conditions of the plurality of predetermined conditions other than the first specific condition, the second specific condition, and the third specific condition are satisfied, the applied pressure of the fixing unit is released or reduced by the applied pressure adjusting mechanism.

13. The image forming apparatus according to claim 8, wherein the heating member includes a cylindrical film and a heater disposed inside the cylindrical film, wherein the heater and the pressing member form the nip portion with the cylindrical film between the heater and the pressing member, and wherein the image on the recording material is heated through the cylindrical film at the nip portion.

* * * * *